(12) United States Patent
Sachee et al.

(10) Patent No.: US 10,188,179 B2
(45) Date of Patent: Jan. 29, 2019

(54) FASTENER

(71) Applicant: APLIX, Le Cellier (FR)

(72) Inventors: Quresh Sachee, Charlotte, NC (US); John Bumgarner, Maiden, NC (US); Marc Woodling, Charlotte, NC (US)

(73) Assignee: APLIX, Le Cellier (FR)

( * ) Notice: Subject to any disclaimer, the term of this patent is extended or adjusted under 35 U.S.C. 154(b) by 115 days.

(21) Appl. No.: 15/027,435

(22) PCT Filed: Oct. 13, 2014

(86) PCT No.: PCT/EP2014/071918
§ 371 (c)(1),
(2) Date: Apr. 6, 2016

(87) PCT Pub. No.: WO2015/052349
PCT Pub. Date: Apr. 16, 2015

(65) Prior Publication Data
US 2016/0242513 A1     Aug. 25, 2016

Related U.S. Application Data

(63) Continuation-in-part of application No. 14/051,470, filed on Oct. 11, 2013, now Pat. No. 9,474,338.

(51) Int. Cl.
*A44B 18/00*     (2006.01)
*F16B 5/07*     (2006.01)

(52) U.S. Cl.
CPC ...... *A44B 18/0073* (2013.01); *A44B 18/0046* (2013.01); *F16B 5/07* (2013.01); *Y10T 24/2742* (2015.01)

(58) Field of Classification Search
CPC . Y10T 24/2708; Y10T 24/43; Y10T 24/2792; Y10T 24/309; Y10T 24/34; B62D 27/06
See application file for complete search history.

(56) References Cited

U.S. PATENT DOCUMENTS 3,505,772 A * 4/1970 De Claire ........... B60R 13/0206
                                                            24/697.1
3,851,357 A * 12/1974 Ribich ............... A44B 17/0035
                                                            24/306

(Continued)

FOREIGN PATENT DOCUMENTS

EP        1481603 A1     12/2004
JP        H09-23907 A     1/1997

(Continued)

OTHER PUBLICATIONS

European Search Report and Written Opinion issued in corresponding EP Application No. 13194264, dated Apr. 9, 2015, (5 pages).

(Continued)

*Primary Examiner* — Jason W San
(74) *Attorney, Agent, or Firm* — Bookoff McAndrews, PLLC (57) ABSTRACT

A fastening element (1) is provided having a gripping portion (5), a plurality of gripping elements (20, 20') extending from the gripping portion (5), a supporting portion (10) being defined by at least one supporting-portion wall extending from the gripping portion (5) in a direction opposite that of the gripping elements (20, 20'), the supporting portion (10) having a supporting-portion width smaller than a gripping-portion width of the gripping portion (5), such that a top flange is formed by the gripping portion (5) relative to the supporting portion (10) on at least one side of the fastening element (1), and an anchoring portion (15) extending from a distal end of at least one supporting-portion wall and parallel to the gripping portion (5) so as to form a bottom flange relative to the supporting portion (10) on the at least one side corresponding to the top flange.

16 Claims, 4 Drawing Sheets

(56) References Cited

U.S. PATENT DOCUMENTS

| | | | | |
|---|---|---|---|---|
| 4,270,328 | A * | 6/1981 | Page | B60R 13/0206 24/292 |
| 4,394,054 | A * | 7/1983 | Nieboer | F16B 2/22 248/27.3 |
| 4,541,036 | A * | 9/1985 | Landries | H02B 1/048 220/3.6 |
| 4,825,515 | A * | 5/1989 | Wolterstorff, Jr. | A44B 11/263 24/196 |
| 5,058,245 | A * | 10/1991 | Saito | A44B 18/0076 24/306 |
| 5,081,709 | A * | 1/1992 | Benyo | A45F 5/02 224/669 |
| 5,180,219 | A * | 1/1993 | Geddie | F21S 48/1208 362/267 |
| 5,245,732 | A * | 9/1993 | Johnston | A44C 5/2071 224/901.2 |
| 5,452,184 | A * | 9/1995 | Scholder | H05K 7/12 24/297 |
| 5,500,268 | A * | 3/1996 | Billarant | A44B 18/0076 24/442 |
| 5,537,720 | A * | 7/1996 | Takizawa | A44B 18/0061 24/442 |
| 5,537,793 | A * | 7/1996 | Murasaki | A44B 18/00 24/306 |
| 5,577,779 | A * | 11/1996 | Dangel | E05C 19/06 220/326 |
| 5,579,562 | A * | 12/1996 | Hattori | F16B 5/07 24/306 |
| 5,634,245 | A * | 6/1997 | Rouser | A44B 18/0053 24/306 |
| 5,655,268 | A * | 8/1997 | Keyaki | A44B 17/0029 24/104 |
| 5,678,286 | A * | 10/1997 | Murasaki | A44B 18/0046 24/444 |
| 5,706,672 | A * | 1/1998 | Miyazaki | F24F 1/022 403/329 |
| 5,800,760 | A * | 9/1998 | Takizawa | A44B 18/0049 264/167 |
| 5,846,017 | A * | 12/1998 | Meyer | F16L 3/13 24/297 |
| 5,857,245 | A * | 1/1999 | Sakakibara | A44B 18/0049 24/306 |
| 5,860,194 | A * | 1/1999 | Takizawa | A44B 18/0046 24/390 |
| 6,112,377 | A * | 9/2000 | Wilson | A44B 18/0065 160/237 |
| 6,120,170 | A * | 9/2000 | Hamelbeck | B60Q 1/26 362/368 |
| 6,176,738 | B1 * | 1/2001 | Consoli | H01R 13/631 439/545 |
| 6,254,304 | B1 * | 7/2001 | Takizawa | A44B 18/0046 24/444 |
| 6,314,622 | B1 * | 11/2001 | Takizawa | A44B 1/08 24/114.9 |
| 6,406,242 | B1 * | 6/2002 | Gordon | E05B 79/06 24/297 |
| 6,430,786 | B1 * | 8/2002 | Ikeda | A44B 17/0029 24/104 |
| 6,451,239 | B1 * | 9/2002 | Wilson | B29C 35/0805 264/322 |
| 6,510,592 | B1 * | 1/2003 | Hamilton | A44B 11/06 24/170 |
| 6,572,945 | B2 * | 6/2003 | Bries | C09J 7/02 24/306 |
| 6,640,348 | B1 | 11/2003 | Clune et al. | |
| 6,772,484 | B2 * | 8/2004 | Miyano | B29C 45/4407 24/297 |
| 7,021,019 | B2 * | 4/2006 | Knauseder | E04F 13/10 24/297 |
| 7,048,984 | B2 * | 5/2006 | Seth | A44B 18/0053 24/452 |
| 7,132,144 | B2 * | 11/2006 | Roberts | A44B 18/0073 428/40.2 |
| 7,141,283 | B2 * | 11/2006 | Janzen | A44B 18/0049 428/36.9 |
| 7,204,000 | B2 * | 4/2007 | Benedetti | F16B 5/123 24/293 |
| 7,308,738 | B2 * | 12/2007 | Barvosa-Carter | A44B 18/0003 24/442 |
| 7,390,057 | B2 * | 6/2008 | Autterson | A44B 18/0053 24/306 |
| 7,582,105 | B2 | 9/2009 | Kolster | |
| 7,644,975 | B2 * | 1/2010 | Ryan | B60R 13/04 24/297 |
| 7,695,057 | B2 * | 4/2010 | Autterson | A44B 18/0053 24/306 |
| 7,954,206 | B2 * | 6/2011 | Scroggie | B62D 29/048 24/297 |
| 8,281,463 | B2 | 10/2012 | Hammer | |
| 8,480,273 | B2 * | 7/2013 | Murata | B60R 1/1207 362/540 |
| 8,678,460 | B2 * | 3/2014 | Stachura | B60R 13/02 248/27.3 |
| 8,732,910 | B1 * | 5/2014 | Paul | F25D 23/028 16/413 |
| 8,943,655 | B2 * | 2/2015 | Kabeya | B60R 11/0217 24/453 |
| 9,004,804 | B2 * | 4/2015 | Yamamoto | F16B 5/126 403/326 |
| 9,155,362 | B2 * | 10/2015 | Shimizu | F16B 21/02 |
| 9,346,433 | B2 * | 5/2016 | You | A44B 11/2523 |
| 9,429,176 | B2 * | 8/2016 | Morris | F16B 2/22 |
| 2004/0137192 | A1 * | 7/2004 | McVicker | B29C 33/14 428/100 |
| 2007/0147954 | A1 | 6/2007 | Autterson | |
| 2008/0244878 | A1 * | 10/2008 | Hoehe | A44B 18/0007 24/445 |
| 2011/0057466 | A1 | 3/2011 | Sachee et al. | |
| 2011/0111165 | A1 | 5/2011 | Mahe | |
| 2011/0167598 | A1 * | 7/2011 | Cheng | B60N 2/5833 24/306 |
| 2011/0209810 | A1 | 9/2011 | Autterson | |
| 2012/0011685 | A1 * | 1/2012 | Rocha | A44B 18/0073 24/449 |
| 2013/0000085 | A1 * | 1/2013 | Cina | A44B 18/0049 24/450 |
| 2016/0236592 | A1 * | 8/2016 | Peniche | B60N 2/0725 |

FOREIGN PATENT DOCUMENTS

| | | |
|---|---|---|
| JP | 2000027817 A | 1/2000 |
| WO | 2012175173 A1 | 12/2012 |
| WO | 2013178339 A1 | 12/2013 |

OTHER PUBLICATIONS

Examination Report issued in corresponding GB App. No. 1418073.1, dated Mar. 2, 2017 (6 pages).

* cited by examiner

FASTENER

PRIORITY

The present application claims priority to U.S. patent application Ser. No. 14/051,470, filed Oct. 11, 2013, the contents of which are herein incorporated by reference in their entirety.

FIELD OF THE DISCLOSURE

The disclosure relates to fasteners, and more particularly to a multi-orientation, slide-in fastener configured for anchoring components.

BACKGROUND OF THE DISCLOSURE

In various industries fasteners play a critical role in the assembly of various products, and it is generally desirable to enable such fasteners to be unfastened in order to permit servicing components either associated with the fasteners or enclosed within an area secured by such fasteners. While it is desirable to enable such fasteners to be unfastened it is also important that such fasteners hold tightly under varying stresses and loads, while also remaining free from generation of sound due to vibration, among others.

For example, in the automotive industry many pieces of a vehicle are fastened to other pieces of the vehicle, e.g. headliners to a roof of the vehicle, and it is important that these fasteners have high closure strength, while remaining silent. It is also desirable that these fasteners are easy to install while also facilitating removal when repairs are needed.

In addition, numerous configurations exist at installation time, for example, in an automotive application, a single fastener design is often insufficient to meet the required installation configuration. Therefore, it is necessary to have numerous fastener configurations available during installation. This means that a manufacturer must be able to provide a number of custom fastener configurations for various applications, which can lead to added cost and manufacturing issues.

U.S. Pat. No. 7,695,057 discloses a plastic spacer/riser to increase usable height of a reclosable fastening system, such as 3M™ Dual Lock™ or Velcro® hook and loop products. The spacer/riser is adapted to be held in place on an external substrate with hot-melt glues sonic welds, pressure-sensitive adhesives, acrylic foam tape, or screws. Such techniques however, may result in eventual failure of the device after periods of varying vibration.

It is accordingly a primary object of the disclosure to provide a fastener which is easy to install, holds fast to the fastened elements, and facilitates removal, but only when desired.

SUMMARY OF THE DISCLOSURE

In accordance with the disclosure, a fastening element is provided. The fastening element includes a gripping portion having a gripping face and a back face, the gripping face comprising at least one row of gripping elements, an anchoring portion located opposite the back face and configured to anchor the fastening element to a retainer, the anchoring portion comprising a flange parallel to the back face and configured to be removably inserted at a portion of the retainer. The flange presents a flange surface area as measured on a lower face of the flange that is between 10 and 90 percent of a gripping face surface area as measured on the gripping face.

By providing a fastening element according to embodiments of the present invention, a multitude orientations for the fastening element is provided. Therefore, it may be possible to easily insert the fastening element in the retainer at any point along the retainer, for example by way of tilting the fastening element to insert a first edge of the flange into the retainer, and then leveling the flange portion so that a second edge of the flange is inserted into the retainer. Moreover, no matter the orientation of the retainer, the fastening element may be inserted in the retainer at a desired orientation so as to correctly mate with a surface to be fastened, thereby eliminating the need to manufacture customized fastening elements for each individual location.

A support connecting the back face with the flange may be provided. Therefore, a desired spacing may be provided between the flange and the gripping portion so as to further enable easy insertion into the retainer.

The flange portion may include twice the number of sides comprised by the gripping portion. Such a feature may enable many orientations of the fastening element for a given retainer cross-section.

At least two edges of the flange may be co-planar with at least two edges of the gripping portion.

The flange may be in the shape of a polygon selected from one of a pentagon, a hexagon, a heptagon, and an octagon.

The gripping portion and the flange may have different shapes, for example, the gripping portion may be rectangular and the flange may be octagonal.

The support may be cylindrical, rectangular, or any polygon as desired.

The flange shape may also be, for example, circular or elliptical.

At least one of the gripping portion and the flange may be asymmetric according to some embodiments.

The at least one row of gripping elements can be bonded to the gripping face. For example, a sheet including the gripping elements and a layer of adhesive may be pressed onto the gripping face. This may enable an assembler to apply a desired gripping element configuration to the gripping face at a time of installation. The sheet of gripping elements may be a single orientation or an alternating orientation.

The flange may include at least one raised portion 39 configured to create an interference fit within the retainer 3. Raised portion 39 may be configured to interact with retainer 3 no matter the orientation at which the flange is inserted into the retainer.

The gripping elements may be selected from one of hooks, loops, and a combination thereof. The hooks may have a single orientation across the entire gripping face, or the hooks may have an alternating orientation across the entire gripping face.

The length of each side of the flange may be equal. For example, an octagonal flange may have 8 equal sides.

The flange surface area as measured on a lower face of the flange may be between 25 percent and 75 percent, in particular between 45 and 55 percent of a gripping face surface area as measured on the gripping face.

One of skill in the art will understand that various combinations of the above elements may be made except where clearly contradictory.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate one (several) embodiment(s) of the disclosure and together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
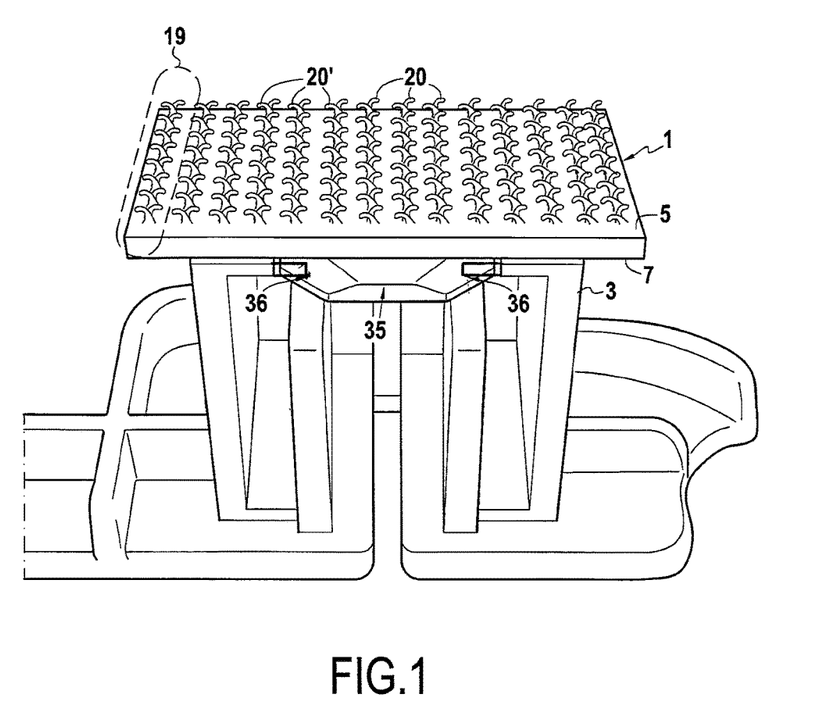
FIG. 1 is an exemplary perspective representation of a fastening element installed in a retainer according embodiments of the present disclosure.

FIG. 1 is an exemplary perspective representation of a fastening element 1 installed in a retainer according embodiments of the present disclosure. Fastener 1 may be configured for insertion into retainer 3 such that fastener 1 is removably inserted within the retainer and remains there under load, for example, when a weight is affixed to gripping elements 20 and/or 20'.

Fastener 1 may be molded, e.g., injection molded, using various materials, for example, thermoplastic, composite, and/or other suitable materials. Thermoplastic materials may include polypropylenes or polyurethanes according to embodiments of the present disclosure. For example, for a polypropylene, a mixture of unsaturated polyester constituted by 50% homopolymer and 50% copolymer can be chosen, having a fluidity index in molten state of 22 g/10 mn and a flexion module of 130,000 to 150,000 psi. Other possible materials include a polypropylene of Atofina, PPC 5660, having a fluidity index in molten state of 7 and a flexion module of 175,000 psi, propylene copolymers of BP Amoco (Acclear 8949 and Acctuf impact copolymer 3934X) having fluidity index values in molten state of 35 to 100, and flexion modules of 190,000 to 250,000 psi; polystyrenes, acrylonitrile butadiene styrenes, high density polyethylene, low density linear polyethylene, polycarbonate. The indexes in molten state are between 1 and 100 and the flexion modules are between 30,000 and 1,140,000, preferably between 100,000 and 1,000,000, more preferably between 300,000 and 1,000,000.

Resins other than propylene-based resins which may be suitable include impact polystyrene, acrylonitrile butadiene styrene, nylon, high density polyethylene, low density linear polyethylene, polycarbonate and olefinic thermoplastic resins. Polypropylenes can also be provided which are reinforced by long glass fibers, having a very high flexion module (resin 30YM240/10010 having a flexion module of 856,000 psi and resin 40YM240/10010 having a flexion module of 1,140,000 psi, sold by StaMax). In this case, the long glass fibers do not migrate into the cavities (which are too small or too thin for the long fibers to penetrate therein), and a very rigid plate is obtained with flexible hooks.

According to some embodiments, fastener 1 is injection molded using a single-step process such that the resulting device is of unitary construction, i.e., all elements of fastener 1 are integrally formed. Such formation may yield desirable strength and ease of fabrication, as well as eliminating need for assembly of layered portions (e.g., a gripping portion layer) to a base layer. The device may comprise a visible injection gate. Alternatively, portions of fastener 1 may be injection molded using a single step process, and for example, gripping elements may be joined to fastener 1 by adhesive, or other suitable bonding (e.g. melting and re-solidification).

Figures 2A, 2B, 2C, 2D:
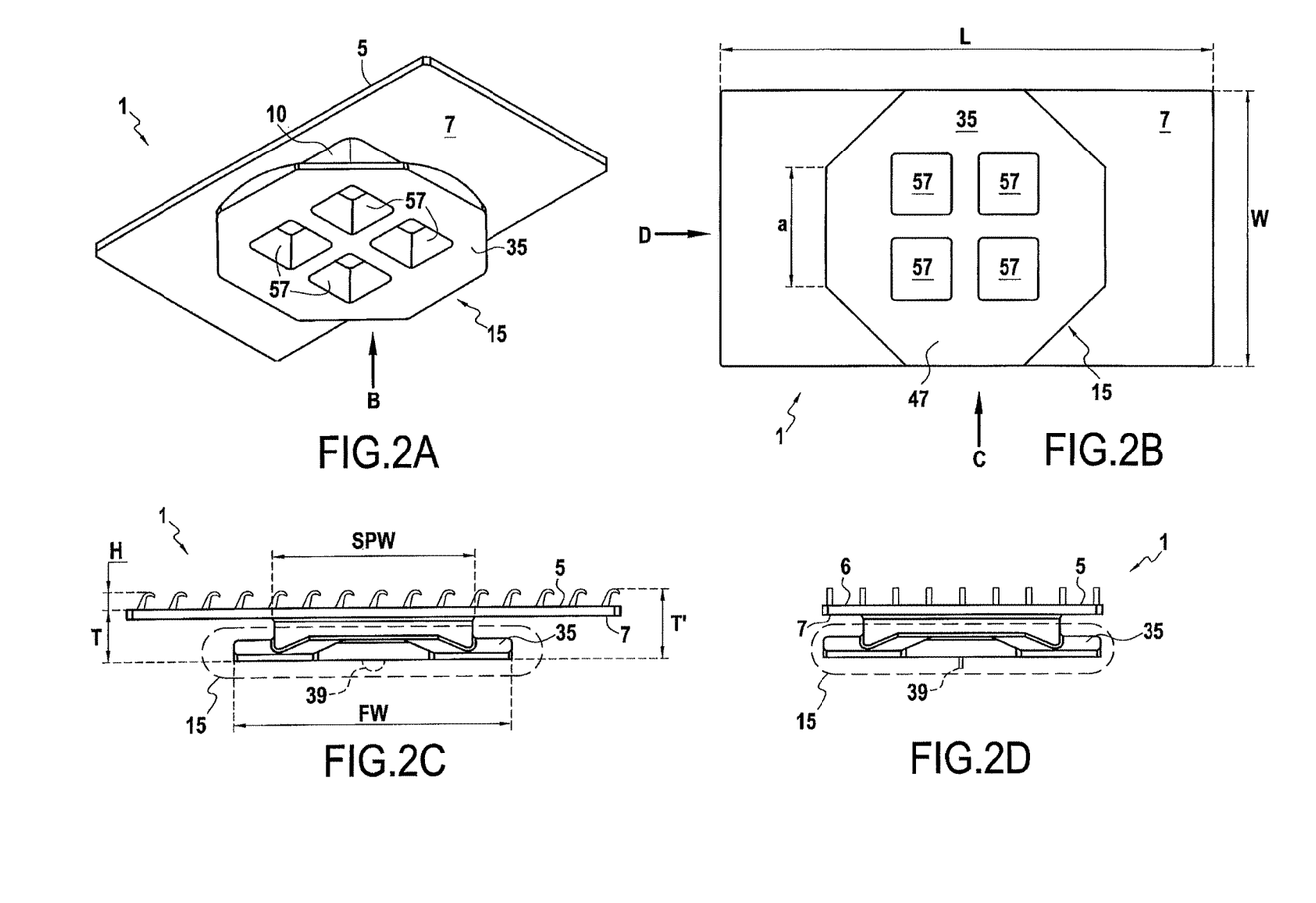
FIG. 2A is a perspective bottom view of the fastening element of FIG. 1.
FIG. 2B is a bottom elevation view of the fastening element of FIG. 1.
FIG. 2C is a side elevation view of the fastening element of FIG. 1.
FIG. 2D is another side elevation view of another side of the fastening element of FIG. 1.

FIG. 2A is a perspective bottom view of the fastening element of FIG. 1, with FIGS. 2B-D showing various elevations of fastener 1. Fastener 1 may present a gripping portion 5, a support 10, and an anchoring portion 15, among others. A thickness T of fastener 1 according to some embodiments may be between about 2 and 30 millimeters, 4 and 10 millimeters, or even 5 and 8 millimeters. Notably, thickness T does not include a height H associated with gripping elements 20 and/or 20', this thickness being T'. In other words, H=T'−T.

Figure 4:
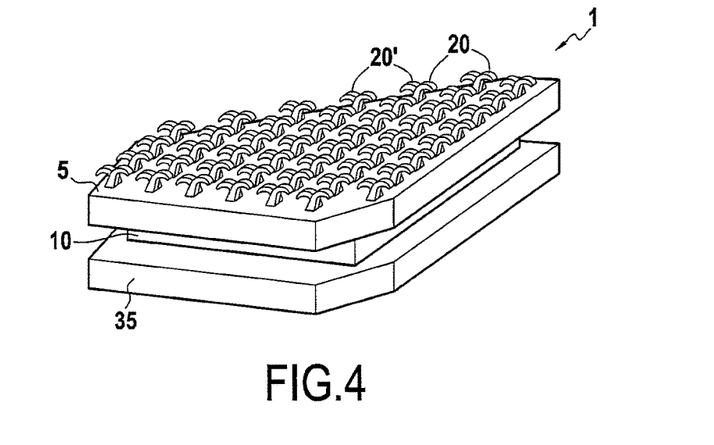
FIG. 4 is another exemplary fastening element having an asymmetric shape.

Gripping portion 5 may present a gripping face 6 and a back face 7. Gripping portion 5 may be of any desirable geometric shape, for example, gripping portion 5 may present a rectangular or other polygonal shape, a rounded shape, etc. According to some embodiments, as shown at FIG. 4 gripping portion may have a polygonal and asymmetric shape. Alternatively, symmetric shapes may be implemented as desired.

Gripping portion 5 may present a gripping face surface area GFSA as measured on gripping face 6 of gripping portion 5. One of skill in the art will recognize that different methods for calculating the surface area of gripping face 6, particularly depending on a shape of gripping portion 5, may be utilized (e.g., computer aided measuring and calculation), and such methods for calculating surface area are well known in the art. For example, gripping face surface area GFSA of gripping face 6 shown at FIG. 2B may be calculated as shown at equation 1.

$$GFSA = L \cdot W \tag{1}$$

According to some embodiments, when a rectangular gripping portion 5 is implemented, a ratio between a length L and a width W of the sides of the rectangle may be between approximately 1.5 and 2.0. This ratio is exemplary, and not intended to be limiting.

Gripping face 6 and back face 7 are parallel to one another and are substantially of the same shape (e.g., rectangular) and size. For example, where gripping face 6 is rectangular, back face 7 may also be rectangular having the same dimensions as gripping face 6.

Gripping portion 5 may be provided with a plurality of gripping elements 20 and/or 20' extending from gripping portion 5 (e.g., from gripping face 6) at a height H. According to some embodiments, gripping elements 20 and/or 20' may extend in rows perpendicularly away from gripping portion 5 such that distal portions of gripping elements 20 and/or 20' are spaced at a predetermined distance from gripping face 6 and back face 7. Importantly, one of skill will understand that gripping elements 20 and/or 20' may extend in any direction desirable for achieving a desired fastening, and the entire plurality of gripping elements 20 and/or 20' need not extend in the same direction. Further, height H may vary among gripping elements 20 and/or 20', or may be substantially uniform.

Figure 3A:
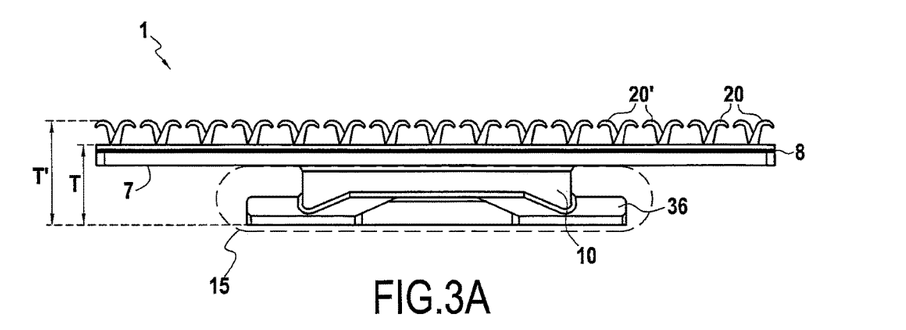
FIG. 3A is an exemplary fastening element having gripping elements of fixed to a gripping face using an adhesive layer and in which the gripping elements have an alternating orientation.
Figure 3B:
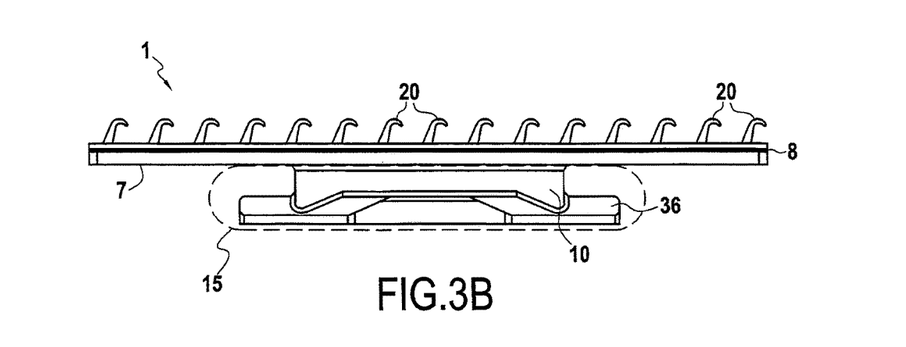
FIG. 3B is an exemplary fastening element with gripping elements having a single orientation over the entire gripping face.

Gripping elements 20 and/or 20' may comprise hooks and/or loops whose characteristics enable gripping elements 20 and/or 20' to achieve fastening with another desired surface, for example, a surface comprising a plurality of loops or hooks designed to interact with gripping elements 20 and/or 20' to effect such a fastening. Gripping elements 20 and/or 20' may be arranged in rows and columns. According to some embodiments gripping elements 20 and/or 20' may be arranged with an alternating orientation of their heads within a row, and over substantially the entire gripping face 6, as shown at, for example 3A so as to facilitate the fastening with the second surface. Alternatively, as shown at FIG. 3B, gripping elements 20 and/or 20' may be arranged with a single orientation over the entire surface of gripping face 6.

As used herein the term "head" relating to a gripping element 20 and/or 20' refers to a distal portion of gripping element 20 and/or 20' where the active portion of the hook is located (i.e., the curved hooking surface).

Gripping elements 20 and/or 20' may cover a substantial area associated with gripping face 6. For example, coverage of at least 50, 60, 70, 80 and even 90 percent of gripping face surface area GFSA may be effected by gripping elements 20 and/or 20'. One skilled in the art will recognize that any desirable coverage amount for gripping elements 20 and/or 20' may be implemented without departing from the scope of the present disclosure.

When gripping elements 20 and/or 20' are implemented as hooks, hooks 20 may have a distinct orientation/bias. In other words, one of skill understands that a single hook has a single direction by which the hooking can be effected. Therefore, it becomes possible to arrange a row 19 of hooks 20 having a single orientation within the row 19 as shown at FIG. 3B. According to some embodiments of the present disclosure, rows having a single orientation may be exclusively placed on gripping face 6, thus providing a plurality of orientations for fastener 1, based on an installation position with retainer 3.

Alternatively, according to some embodiments, orientation of hooks 20 may be alternated throughout a row 19 of hooks 20 and 20', so as to present an alternating orientation, as shown at FIGS. 1, 3A, and 4. Such a configuration thus provides a reduced number of distinct orientations for fastener 1 within retainer 3, but with greater flexibility for a material to be fastened (e.g., greater chance of a fastening loop being caught on a hook).

Anchoring portion 15 may be configured to enable fastener 1 to be anchored within a retainer 3 or other suitable portion of a part to be fastened, or alternatively to a surface to which the part is to be fastened. Anchoring portion 15 may therefore extend parallel to back face 7 of gripping portion 5 so as to form a flange 35. Flange 35 may present a lower surface 47 having a series of voids 57, i.e., absence of material, (see FIG. 2B), for example resulting from a molding process and configured to reduce material usage. Alternatively flange 35 may present a lower surface 47 which is solid (see FIG. 2E), as desired.

Flange 35 may be configured to be removably inserted at a portion of retainer 3. Therefore, flange 35 may present a flange surface area as measured on a lower face 47 of flange 35, that is between 10 and 90 percent of gripping face surface area GFSA as measured on gripping face 6, better, between 20 and 70 percent, better still between 30 and 65 percent. According to further embodiments, flange surface area FSA may be preferably between 45 and 55 percent of gripping face surface area GFSA.

Figure 2E:
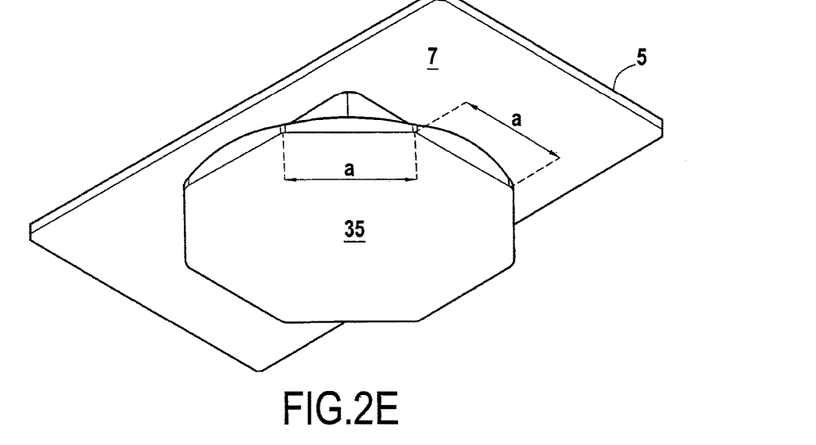
FIG. 2E is a representation of an alternative lower face of a flange portion according to embodiments of the present disclosure.

When measuring flange surface area FSA for purposes of the present disclosure, voids 57 in flange 35 are not to be subtracted from the surface area, and should be treated as part of flange surface area FSA of flange 35. Thus, as an example, a flange surface area of an octagonal flange 35 as shown at both FIG. 2B and FIG. 2E may be calculated using equation 2.

$$FSA = 2(1+\sqrt{2})a^2 \qquad (2)$$

Flange 35 may be configured such that a flange thickness TF of flange 35 is between 5 and 15 percent of a maximum width of flange 35. For example, for an octagonal flange having a circum diameter of 20 mm, a thickness TF of flange 35 may be approximately 1.4 mm.

Flange 35 may have a shape different from that of gripping portion 5. For example, where flange 35 is octagonal, gripping portion 5 may be rectangular. Such a configuration enables multiple orientations of fastener 1 during installation.

Further, flange 35 may include twice the number of sides comprised by gripping portion 5. For example, where gripping portion 5 is a rectangular shape (i.e., four sided polygon), flange 35 may have an octagonal shape (i.e., an eight sided polygon). Similarly, where gripping portion 5 is triangular (i.e., a three sided polygon), flange 35 may have a hexagonal shape (i.e., a six sided polygon). One of skill in the art will recognize that such a pattern may be continued and/or modified as desired.

At least two edges of flange 35 may be co-planar with at least two edges of gripping portion 5. For example, as shown at FIG. 2B, an octagonally shaped flange 35 may have opposing sides coplanar with two opposing sides of a rectangular gripping portion 5. This may facilitate installation and retaining of fastener 1 within retainer 3.

Flange 35 may be of any desired shape, and particularly, may be a polygon or a rounded shape. When flange 35 is a polygon, a shape may be selected from one of a pentagon, a hexagon, a heptagon, an octagon, etc. One of skill will recognize that this list of shapes is not exhaustive, and other shapes are intended to fall within the scope of the present disclosure. When such polygons are implemented, lengths of each side of the polygon may be substantially equal (e.g., as shown at FIG. 2B). Of course, as one of skill will understand, such side lengths may also be unequal, depending on a given implementation.

When a rounded shape is implemented for flange 35, such a shape may be selected from a circle, an ellipse, a hemisphere, a crescent, etc.

Flange 35 may include at least one chamfer 36. Chamfer 36 may be configured, for example, to facilitate insertion of flange 35 into retainer 3. Chamfer 36 may therefore be located on a top and/or bottom portion of flange 35, for example. Thus, flange 35 may be chamfered such that at least one chamfer extends in a direction parallel to back face 7 of gripping portion 5.

Chamfer 36 may form an angle with a plane perpendicular to back face 7 ranging between 1 and 60 degrees, for example, between 20 and 45 degrees. Chamfer 36, being located on flange 35 can be present on a leading portion of anchoring portion 15 as anchoring portion 15 is installed into retainer 3.

Flange 35 may include other chamfer configurations as well. Such chamfers may be desirable where, for example, anchoring portion 35 is to be installed in channel type or other narrow height retainer 3, and may permit additional interference fitting of flange 35 within retainer 3.

Notably flange 35 may include one or more raised portions 39 (see FIG. 2C) configured to create an interference fit within the retainer. Raised portion 39 may be formed as additional material at particular locations on fastener 1, and may present a variety of shapes and sizes. For example, raised portion 39 may be unitarily formed with fastener 1 and may further be of arcuate or partially spherical shape.

FIG. 2C is an exemplary representation highlighting placement of one or more raised portions 39 according to embodiments of the present disclosure. One or more raised portions 39 may be formed at various locations of fastener 1, for example, extending from a plane comprising a bottom surface of anchoring portion 15 and beyond an envelope surface of body 9 (e.g., extending from crosspiece 14). According to some embodiments, raised portion 39 may be located at a geometric center of the plane comprising a bottom surface of anchoring portion 15. In addition, or alternatively, raised portion 39 may be located within groove 17, and may extend perpendicular or parallel to back face 7.

Importantly, any combination of locations for one or more raised portions 39 may be implemented without departing from the scope of the present disclosure.

Where an arcuate or partially spherical shape is implemented for raised portion 39, raised portion 39 may present a radius of curvature of between 2 and 3 times thickness T of fastener 1. For example, a protrusion may have a radius of curvature ranging between 10 and 30 mm, 14 and 18 mm, for example 16 mm. One of skill will recognize that where opposed raised portions 39 are implemented, e.g., on back face 7 and a top surface of anchoring portion 15, this radius of curvature may be modified to facilitate installation of fastener 1 while continuing to provide a desired level of interference between the installed portions.

Further, by implementing raised portions 39, the resulting interference may reduce or eliminate rattle and movement of fastener 1 in its installed condition.

Anchoring portion 15 may include a support 10 extending from back face 7 to connect flange 35 with gripping portion 5. Importantly, while support 10, anchoring portion 15, and gripping portion 5 are referred to herein as a separate portions, one of skill will understand that where fastener 1 has been unitarily formed, this reference is for ease of understanding only and that it is not intended that such portions be distinctly separate.

Support 10 may be of any suitable thickness and any desirable height for purposes of spacing gripping portion 5 and anchoring portion 15. For example, a height of support 10 may represent between 20 and 70 percent of the overall thickness T of fastener 1, better between 35 and 60 percent, and preferably between 40 and 50 percent.

Support 10 may present a supporting-portion width SPW that is smaller than both a gripping-portion width W of gripping portion 5 and a flange width FW of flange 35. One of skill in the art will recognize that depending on a fastening configuration desired and a shape associated with gripping portion 5.

FIGS. 3A and 3B show a fastener 1 where anchoring portion 15, support 10, and gripping portion 5 are formed by injection molding, but without gripping elements 20 and or 20'. Following fabrication of these three portions, a layer (e.g., a sheet) having gripping elements 20 and/or 20', and, for example, an adhesive layer 8 (e.g., thermoplastic material, thermofusible adhesive, etc.), may be brought into contact with gripping face 6 of gripping portion 5, to result in a completed fastener 1. Alternatively, a layer of adhesive 8 may be first applied to gripping face 6, and a layer of gripping elements 20 and/or 20' affixed to the adhesive. According to some embodiments, adhesive 8 may then be cured, e.g., by heat curing.

Adhesive layer 8 may be any suitable adhesive presenting desired strength and curing properties based on an application.

Importantly, FIG. 3A is also shown and described herein as having a single orientation of hooks 20, while FIG. 3B is also described herein as having an alternating orientation of hooks 20 and 20'. However, this is not intended to indicate that these features must be used in combination. Adhesive layer 8 may be used in any of the configurations described herein for affixing gripping elements 20 and 20' to gripping face 5. Further, single orientation and alternating orientations of gripping elements 20 and 20' may also be used without an adhesive layer 8, e.g., formed unitarily by injection molding with fastener 1.

FIG. 4 is another exemplary fastening element 1 having an asymmetric shape and forming a polygon. According to FIG. 4 an alternating orientation of gripping elements 20 and 20' is present, however, depending on a particular installation, asymmetric fasteners 1 may also be implemented with a single orientation of gripping elements 20 and/or 20'.

Figure 5:
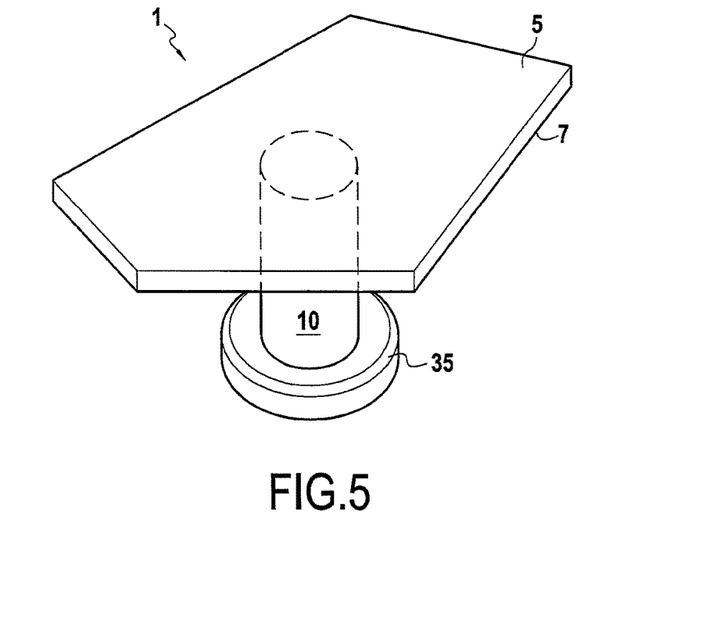
FIG. 5 is yet another exemplary fastening element having a cylindrical support and a cylindrical flange.

FIG. 5 is yet another exemplary fastening element 1 where a cylindrical support 10 and a round (e.g., cylindrical) flange 35 is presented. Gripping elements 20 and/or 20' are not shown at FIG. 5, however, one of skill in the art will recognize that a single orientation or alternating orientation of gripping elements 20 and/or 20' may be implemented.

Further, fastener 1 of FIG. 5 may have a gripping portion of any desired shape. The asymmetric shape (e.g., pentagon) may be helpful in such a configuration, because a cylindrical flange and support allow a substantial number of install positions for fastener 1.

One of skill in the art will recognize upon reading the present disclosure that fastener 1 can be implemented in any number of designs for effecting a fastening. For example, automotive headliners, door liners, and other elements may be securely fastened while enabling easy removal when repairs or other conditions dictate.

Further, according to some embodiments, fastener 1 has less than 100 orientations, in particular less than 25 orientations, in such case 10 or less than 10 orientations, relative to retainer 3.

Although the present disclosure herein has been described with reference to particular embodiments, it is to be understood that these embodiments are merely illustrative of the principles and applications of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances, unless otherwise specified herein.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

What is claimed is:

1. A slide-in fastening element presenting a multitude of installed orientations, comprising:
   a gripping portion having a gripping face and a back face, the gripping face comprising at least one row of gripping elements;
   an anchoring portion located opposite the back face and configured to anchor the fastening element to a retainer, the anchoring portion comprising a flange parallel to the back face and having a shape selected from among a pentagon, a hexagon, a heptagon, and an octagon, enabling the slide-in fastening element to be retained in one of the multitude of orientations, wherein the flange is configured to be removably inserted at a portion of the retainer; and
   a support connecting the back face with the flange, and having a height measured between the back face and the flange, wherein
   the flange presents a flange surface area (FSA) defined by a flange length and a flange width as measured on a lower face of the flange that is between 10 and 90 percent of a gripping face surface area (GFSA) as measured on the gripping face, and
   wherein the support includes a support length and a support width, wherein the support length and the support width are less than the flange length and the flange width.

2. The fastening element according to claim 1, comprising a support connecting the back face with the flange.

3. The fastening element according to claim 1, wherein the flange comprises twice the number of sides comprised by the gripping portion.

4. The fastening element according to claim 1, wherein at least two edges of the flange are co-planar with at least two edges of the gripping portion.

5. The fastening element according to claim 1, wherein the gripping portion and the flange have different shapes.

6. The fastening element according to claim 5, wherein the gripping portion is rectangular and the flange is octagonal.

7. The fastening element according to claim 2, wherein the support is cylindrical.

8. The fastening element according to claim 1, wherein at least one of the gripping portion and the flange are asymmetric.

9. The fastening element according to claim 1, wherein the at least one row of gripping elements is bonded to the gripping face.

10. The fastening element of claim 9, wherein the bonding is performed by an adhesive layer.

11. The fastening element of claim 1, wherein the flange comprises at least one raised portion configured to create an interference fit within the retainer.

12. The fastening element of claim 1, wherein the gripping elements comprise one of hooks and loops.

13. The fastening element of claim 12, wherein the hooks have a single orientation across the entire gripping face.

14. The fastening element of claim 12, wherein the hooks have an alternating orientation across the entire gripping face.

15. The fastening element of claim 1, wherein a length (a) of each side of the flange is equal.

16. The fastening element of claim 1, wherein the flange surface area (FSA) as measured on a lower face of the flange is between 45 and 55 percent of the gripping face surface area (GFSA) as measured on the gripping face.

* * * * *